(12) United States Patent
Wysong (10) Patent No.: US 6,662,706 B2
(45) Date of Patent: Dec. 16, 2003

(54) HYDRAULIC SYSTEM

(75) Inventor: Douglas E. Wysong, Camden, OH (US)

(73) Assignee: Finn Corporation, Fairfield, OH (US)

( * ) Notice: Subject to any disclaimer, the term of this patent is extended or adjusted under 35 U.S.C. 154(b) by 0 days.

(21) Appl. No.: 10/159,396

(22) Filed: May 30, 2002

(65) Prior Publication Data

US 2002/0139117 A1 Oct. 3, 2002

Related U.S. Application Data

(63) Continuation of application No. 09/579,295, filed on May 25, 2000.

(51) Int. Cl.[7] .................................................. F15B 13/00
(52) U.S. Cl. ............................................................ 91/518
(58) Field of Search .......................... 91/518, 433, 514, 91/446; 60/399, 403

(56) References Cited

U.S. PATENT DOCUMENTS

| | | | | |
|---|---|---|---|---|
| 2,602,294 A | * | 7/1952 | Sedgwick | |
| 3,132,622 A | * | 5/1964 | Hackenberger | |
| 3,680,583 A | * | 8/1972 | Clair | |
| 3,863,448 A | * | 2/1975 | Purdy | |
| 4,230,022 A | * | 10/1980 | Bianchetta et al. | |
| 4,275,793 A | * | 6/1981 | Schivley, Jr. et al. | |
| 4,436,115 A | * | 3/1984 | Budzich | 91/446 |
| 4,478,131 A | * | 10/1984 | Liermann et al. | |
| 4,635,440 A | * | 1/1987 | Kropp | |
| 4,711,090 A | * | 12/1987 | Hartiala et al. | |
| 5,181,804 A | * | 1/1993 | Wysong et al. | |
| 5,299,888 A | * | 4/1994 | Wysong et al. | |
| 5,556,237 A | * | 9/1996 | Rexius | |
| 6,220,027 B1 | * | 4/2001 | Heusser | |

* cited by examiner

Primary Examiner—Edward K. Look
Assistant Examiner—Michael Leslie
(74) Attorney, Agent, or Firm—Dinsmore & Shohl LLP (57) ABSTRACT

A hydraulic system comprises a variable displacement pump. The hydraulic system includes a first device capable of being hydraulically powered by the pump and a reversing device adapted to cause the first device to autoreverse. The hydraulic system also includes an isolation device adapted to prevent pressure surges resulting from a source other than the first device from actuating the reversing device, thereby preventing undesirable autoreversing of the first device.

35 Claims, 6 Drawing Sheets

HYDRAULIC SYSTEM

CROSS-REFERENCE TO RELATED APPLICATIONS

This application is a continuation of U.S. application Ser. No. 09/579,295 filed May 25, 2000.

TECHNICAL FIELD

This invention relates generally to an system for use with a distributing assembly, and more particularly to a hydraulic system including functional devices for operating a bulk material distributing assembly.

BACKGROUND OF THE INVENTION

Conventional discharge assemblies are known to use variable speed drives to control the various functional devices on the bulk material discharge assembly. Known functional devices typically include an airlock discharge assembly, a feed roll, a discharge gate, a floor conveyor and/or an agitator.

The functional devices are known to be powered by hydraulics. In particular, conventional hydraulic assemblies comprise a fixed displacement pump wherein the amount of oil being pumped is directly proportional to the rotational speed of the input shaft. In conventional discharge assemblies, an engine typically drives the fixed displacement hydraulic pump to power the functional devices as well as a rotary lobe type blower to generate the airflow used to discharge the bulk material. In many cases, it is desirable to run at lower engine speeds to decrease the airflow rate. However, running the engine at a lower speed also undesirably decreases the hydraulic fluid flow. In order to maintain the desired performance of the functional devices at low engine speeds, the hydraulic pumps must be oversized, resulting in an undesirable excess capacity when running the engine at full speed.

In the past, priority dividers have been used to divide the hydraulic flow from the fixed displacement pumps into a priority flow and an excess flow. Any flow of hydraulic fluid from the fixed displacement pump is first supplied to the priority side to power the priority devices, and only after the total demand for the priority flow is met will hydraulic fluid be supplied to the excess side for powering the non-priority devices. Thus, as the engine speed is reduced, the blower speed reduces, therefore decreasing the airflow. In addition, decreasing the engine speed also reduces the speed of the fixed displacement hydraulic pump, initially decreasing the speed of the non-priority devices while maintaining the speed of the priority devices at a constant rate. By arranging the feeding devices (e.g., the floor conveyor, the agitator, and the feed roll) as non-priority devices, the engine speed may be used to control the bulk material flow rate. Thus, by reducing the engine speed, the material is discharged with the blower at a slower rate, while the feeding devices also introduce the bulk material into the discharge assembly at a slower rate.

Figure 1:
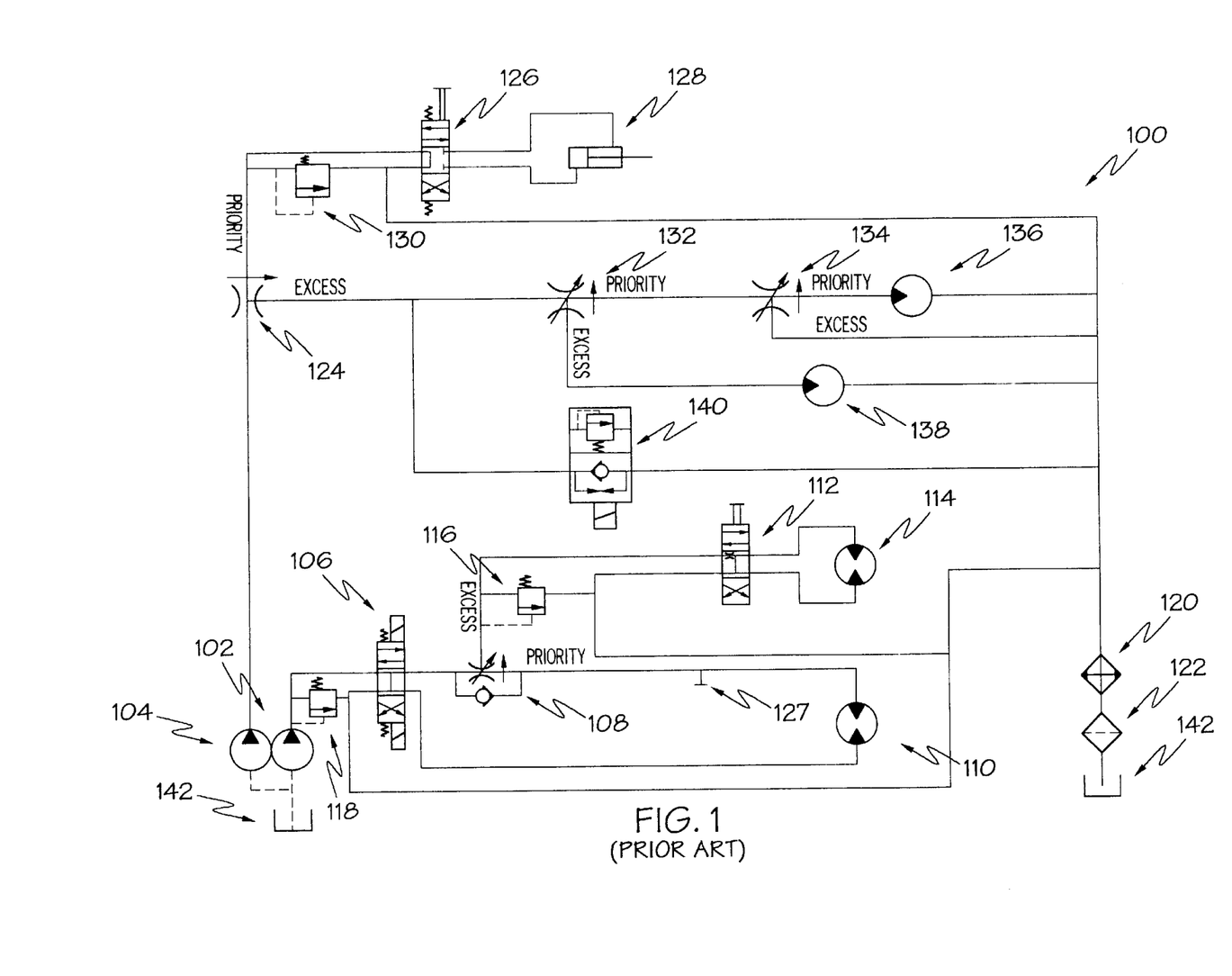
FIG. 1 illustrates a schematic diagram of a first conventional hydraulic assembly.

FIG. 1 illustrates a conventional hydraulic assembly 100 having five functional devices comprising an airlock discharge assembly 110, a feed roll 114, a discharge gate 128, a floor conveyor 136, and an agitator 138. The five functional devices are each run by one of two fixed displacement pumps 102, 104. The first fixed displacement pump 102 hydraulically powers the airlock discharge assembly 110 and the feed roll 114. A pressure compensated adjustable priority divider 108 is provided to divide the hydraulic fluid flow into a priority flow and an excess flow. The airlock discharge assembly 110 is a priority device (i.e., the airlock discharge assembly 110 is powered by the priority flow from the first fixed displacement pump 102) while the feed roll 114 is a non-priority device (i.e., the feed roll 114 is powered by the excess flow from the first fixed displacement pump 102). Accordingly, any reduction in the speed of the first fixed displacement pump 102 will first reduce the speed of the feed roll 114 while the speed of the airlock discharge assembly 110 remains constant. This relationship may be beneficial since the feed roll 114 is one means for controlling the feed rate of the bulk material.

An electric control valve 106 and relief 118 is provided to control the rotational direction of the airlock discharge assembly 110 and feed roll 114. A manual control valve with speed control 112 and relief 116 is also provided to control the speed of the feed roll while allowing the rotational direction of the feed roll to be changed without changing the direction of the airlock discharge assembly 110. Relief valves 116 and 118 are provided to protect against excessive hydraulic pressure. If the system experiences a maximum pressure, the relief valves 116 and 118 will allow additional hydraulic fluid to drain through the exit line for eventual recovery by the hydraulic tank 142. The exit line includes a cooler 120 for lowering the temperature of the hydraulic fluid and a filter 122 for removing impurities from the system before recovery by the hydraulic tank 142.

The second fixed displacement pump 104 hydraulically powers the discharge gate 128, the floor conveyor 136, and the agitator 138. A fixed priority divider 124 divides the hydraulic fluid flow into a priority flow and a non-priority flow such that the discharge gate 128 is a priority device while the floor conveyor 136 and the agitator 138 are non-priority devices. However, since the priority flow of the fixed priority divider 124 is very low when compared to the volume output of the pump 104 at any engine speed, excess flow is always available. The gate circuit on the priority side is protected from over pressurization by the relief valve 130. A manual control valve 126 with relief 130 is provided to control the discharge gate 128, opening or closing the gate 128 depending on the direction the handle is actuated.

A dump valve with relief 140 on the excess side of the priority divider 124 provides a means of actuating the floor conveyor 136 and agitator 138 electrically, and provides pressure protection for this portion of the circuit. An additional adjustable priority divider 132 is provided to give the floor conveyor 136 priority over the agitator 138. Accordingly, any reduction in the speed of the second fixed displacement pump 104 will initially cause the speed of the agitator 138 to decrease prior to any decrease in speed of the conveyor 136. An electrically adjustable priority flow divider 134 allows the floor conveyor 136 speed to be further controlled, with the excess hydraulic fluid being sent to the hydraulic tank 142.

Figure 2:
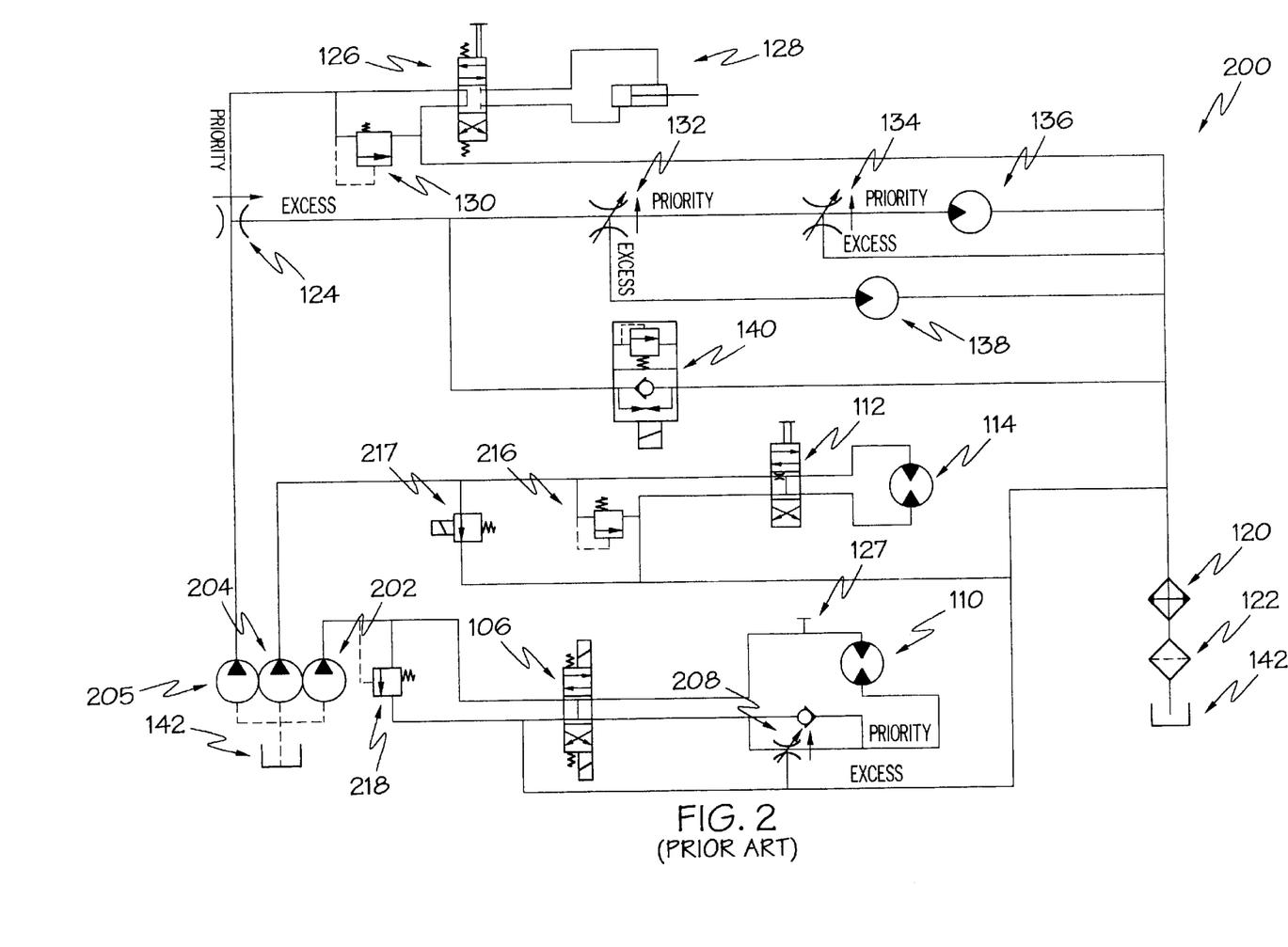
FIG. 2 illustrates a schematic diagram of a second conventional hydraulic assembly.

Another conventional hydraulic assembly 200 is illustrated in FIG. 2. The hydraulic assembly 200 has many similar elements as the hydraulic assembly 100 illustrated in FIG. 1, as indicated by the identical reference characters. The hydraulic assembly 200 of FIG. 2 was modified to include three fixed displacement pumps 202, 204, and 205 in an attempt to reduce system vibration.

The first fixed displacement pump 202 was provided to power the airlock discharge assembly 110. A pressure compensated adjustable priority divider 208 is provided to send excess flow through the exit path for later recovery by the hydraulic tank 142. A relief valve 218 was further provided to protect the pump and hydraulic system.

The second fixed displacement pump 204 was provided to power the feed roll 114. A relief valve 216 and another electrically actuated dump valve 217 were provided to protect the second fixed displacement pump 204 and the hydraulic system, and provide means for electric actuation of the feed roll 114.

While functioning advantageously in many applications, these systems are somewhat disadvantageous in that the floor conveyor 136 speed does not slow with a change in engine speed due to being on a priority flow circuit. The relatively low fluid flow requirements of the conveyor 136 will not allow this to be a non-priority function as desired because slowing engine speed would reduce oil flow quickly below an operational level. Moreover, the conventional systems using a fixed displacement pump typically generate excess heat when a great deal of speed control is required. Excess heat is created at pressure drops occurring across the priority dividers. Since the conventional fixed displacement pumps generate flow whether or not in demand by the functional devices, unwanted excess heat is created in the system. It is known to provide a pressure switch 127 to cause an automatic reverse function of the airlock discharge assembly 110. However, these systems do not allow reversing of all functions, for example, to reverse direction in response to objects lodging and/or stalling the functional devices. To do so would add much more componentry, compounding the heat generation of the system.

SUMMARY OF THE INVENTION

Accordingly, it is an object of the present invention to obviate problems and shortcomings of conventional hydraulic systems. More particularly, it is an object of the invention to provide hydraulic systems which create a reduced amount of heat during operation, optionally with speed control capabilities. It is a further object of the present invention to provide systems having an autoreverse functional device but prevent inadvertent autoreverse of the functional device in the systems as a result of a pressure spike from a source other than the functional device.

It is another object of the invention to provide hydraulic systems for powering various functional devices at different engine speeds.

To achieve the foregoing and other objects in accordance with the present invention, systems are provided in order to prevent inadvertent autoreverse of at least one of their functional devices. The systems include a variable displacement pump for providing hydraulic power. The systems further include a first device capable of being hydraulically powered by the pump and a reversing device adapted to cause the first device to autoreverse. The systems further include an isolation device adapted to prevent pressure surges resulting from a source other than the first device from actuating the reversing device, thereby preventing undesirable autoreversing of the first device.

To further achieve the foregoing and other objects in accordance with the present invention, hydraulic systems are provided including a variable displacement pump, a first device capable of being hydraulically powered by the pump, and an actuator adapted to actuate a second device based on a pressure surge from the first device. The hydraulic systems further comprise an isolation device adapted to prevent pressure surges resulting from a source other than the first device from actuating the actuator, thereby preventing undesirable actuation of the second device.

Still other objects and advantages of the present invention will become apparent to those skilled in the art from the following description wherein there are shown and described alternative exemplary embodiments of this invention. As will be realized, the invention is capable of other different, obvious aspects and embodiments, all without departing from the invention. Accordingly, the drawings and descriptions should be regarded as illustrative in nature and not as restrictive.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION

Figure 5:
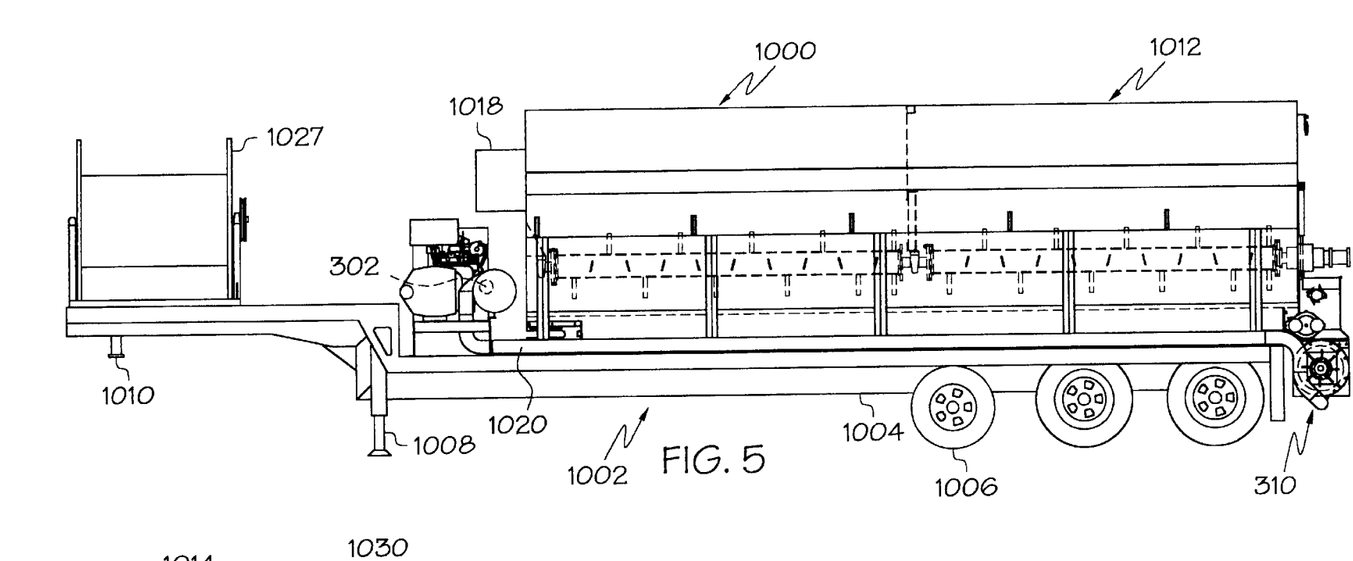
FIG. 5 illustrates a side elevational view of a bulk material discharge assembly in accordance with the present invention.

FIG. 5 illustrates a side elevational view of a bulk material discharge assembly 1000 in accordance with the present invention. The bulk material discharge assembly 1000 may be mounted on a support surface such as a pallet or stand for elevating the assembly 1000, on a foundation (e.g., a concrete foundation), or directly on a ground surface.

As shown in FIG. 5, the bulk material discharge assembly 1000 may also be installed on a trailer 1002 or other transportation device for mobility. In one example, a trailer 1002 may include a chassis 1004 having wheels 1006 for transporting the bulk material discharge assembly 1000. The trailer 1002 may further include a jack or elevation device 1008 for adjusting the orientation of the bulk material discharge assembly 1000, or for supporting the trailer 1002 at a desired discharging location and/or orientation. For instance, a jack 1008 may be used to maintain the bulk material discharge assembly 1000 in a substantially horizontal orientation regardless of any irregular surfaces on which the trailer is supported. In addition, a jack 1008 may be extended to elevate the forward portion of the trailer, thereby tipping the bulk material discharge assembly 1000 such that bulk material is encouraged to travel to the rear portion 1028 of a hopper 1012 for distribution.

The trailer 1002 may further include a kingpin 1010, thereby allowing the trailer 1002 to be transported via a truck (not shown). The bulk material discharge assembly 1000 typically includes a hopper 1012 for containing bulk materials (not shown) and an engine 1014 for powering a blower 1016 and a variable displacement hydraulic pump 302.

In use, the blower 1016 forces air through conduit 1020, through an inlet conduit, and into an airlock discharge assembly, for example, airlock discharge assembly 310 as shown in FIG. 5. Bulk material is then entrained into the air stream and thereafter forced through the outlet conduit.

Entrained, throughout this application, is intended to mean mixing any material in another flowing material to form a heterogeneous or homogeneous mixture. Bulk material may include any material that may be entrained in a flowing material for distribution. For instance, bulk material may comprise composts, chipped woods, chipped barks, mulches, seeds, grains, hays, fertilizers, sands, herbicides, pesticides, (e.g., insecticides), plastic pellets, salts or the like. The bulk material may be mixed with other solids and/or liquids prior to, during, and/or after entraining with the flowing material. For instance, mulch may be treated with water before, during and/or after entraining in order to prevent significant diffusing of the mulch into the atmosphere, thereby more efficiently and effectively placing material on a surface in the desired distribution area. In one particular application, a highly pulverized, fine wood mulch material commonly referred to as "black gold" is entrained with air by an airlock discharge assembly and thereafter distributed around trees, bushes, or other landscape terrain. In another example, seed may be mixed with compost and/or fertilizer to encourage seedling growth. In another application, the bulk material may be mixed with solid/liquid herbicides and/or pesticides to deter weed growth and/or protect living organisms (e.g., plants).

Figure 7:
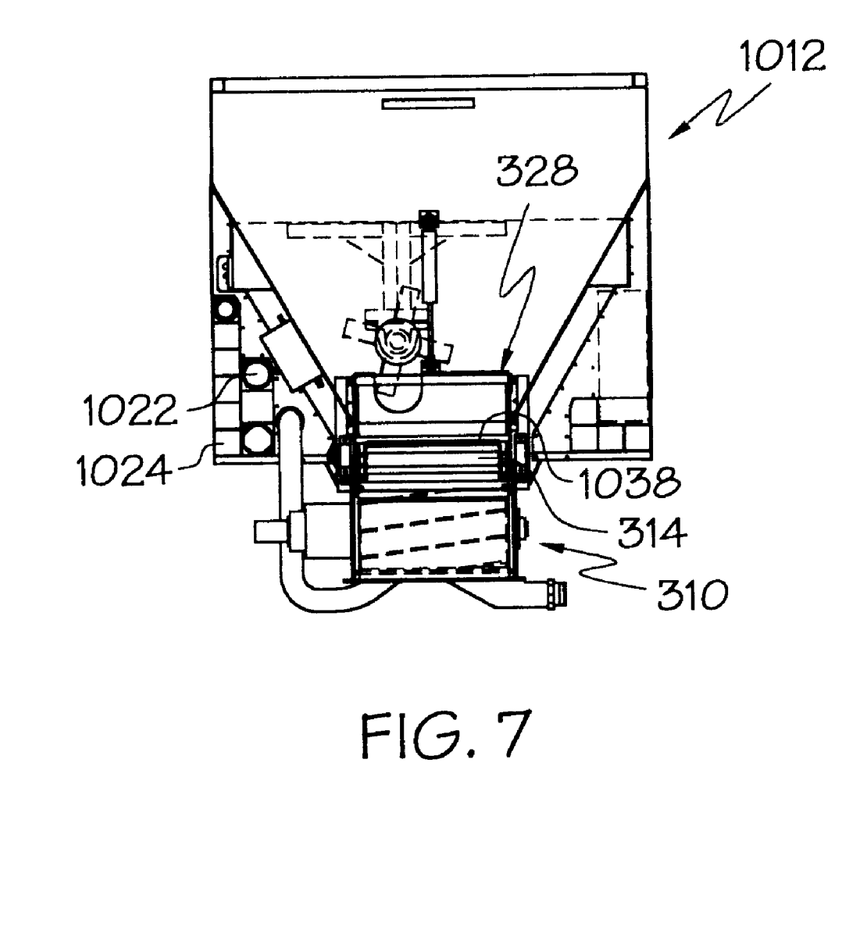
FIG. 7 is a rear elevational end view of the bulk material discharge assembly of FIG. 5 and including a discharge assembly as shown in accordance with the present invention.

When dispensing bulk material, a conduit or pipe, e.g., discharging conduit 1022, may be removed from storage spaces, e.g., storage spaces 1024 as shown in FIG. 7. A distal end portion of the discharge conduit 1022 may be connected to the outlet conduit in order to properly discharge the bulk material. Additional discharge conduits 1022 may be linked in series to effectively lengthen the discharge conduit. A plurality of spaces 1024 may be provided to store different sized or a plurality of similarly sized discharge conduits 1022. In addition, or alternatively, a storage spool 1027, as shown in FIG. 5, may be provided in order to store additional discharge conduits.

The engine 1014 powers a variable displacement hydraulic pump 302 that provides a flow of hydraulic fluid from the hydraulic tank 1018 for operating certain functions of the bulk material discharge assembly 1000. For example, the airlock discharge assembly 310 described above may be powered by the variable displacement hydraulic pump 302.

Figure 6:
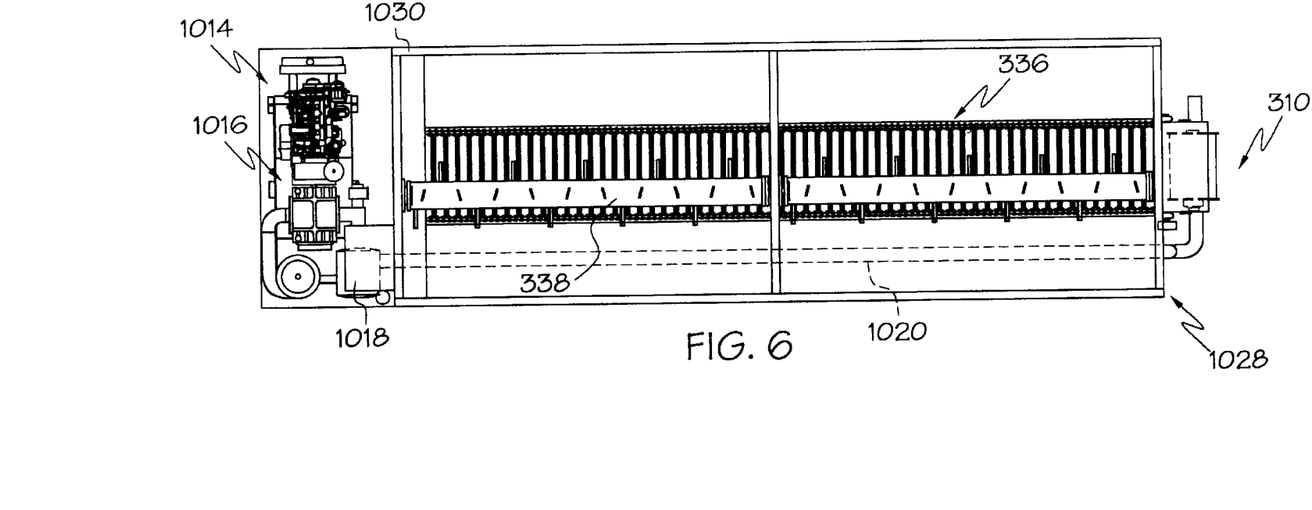
FIG. 6 illustrates a partial top plan view of the material discharge assembly of FIG. 5 in accordance with the present invention.

The bulk material discharge assembly 1000 may also be provided with feeding devices (e.g., a feed roll 314, a floor conveyor 336, and an agitator 338) for feeding bulk material into the airlock discharge assembly 310. As best shown in FIG. 6, the agitator 338 can be provided to encourage material to travel from the rear 1028 of the hopper 1012 to the front 1030 of the hopper 1012. The floor conveyor 336 encourages movement of the bulk material from the front 1030 of the hopper 1012 back to the rear 1028 of the hopper 1012. The agitator 338 and floor conveyor 336 act together to prevent "bridging" of the bulk material, thereby encouraging a continuous feed of bulk material through a hopper opening 1038.

The feed roll 314 encourages and controls the consistent flow of bulk material entering into the airlock discharge assembly 310, for instance, into the airlock material inlet of the airlock discharge assembly 310. In one embodiment, the feed roll 314 comprises a rotating pipe shaft wherein its axis of rotation may be located generally above the floor conveyor 336. The pipe shaft of the feed roll 314 may include a plurality of spikes extending from the pipe shaft. In one particular embodiment, the spikes are substantially "V" shaped in order to tear at the bulk material as the floor conveyor 336 feeds material in a direction toward the airlock discharge assembly 310. The spikes may be arranged about and along the pipe shaft such that one full rotation of the pipe shaft causes the spikes to rake the entire lateral width of the bulk material across the hopper opening 1038.

The vertically operating discharge gate 328, as shown in FIG. 7, controls the size of the hopper opening 1038, and therefore the feed of bulk material into the airlock discharge assembly 310. The discharge gate 328 may be vertically raised in order to enlarge the hopper opening 1038 and maximize the bulk material flow, or vertically lowered to reduce the hopper opening 1038 and minimize the bulk material flow. In transit of the bulk material discharge assembly, the discharge gate 328 may entirely close off the hopper opening 1038 in order to prevent any loss of bulk material.

Figure 3:
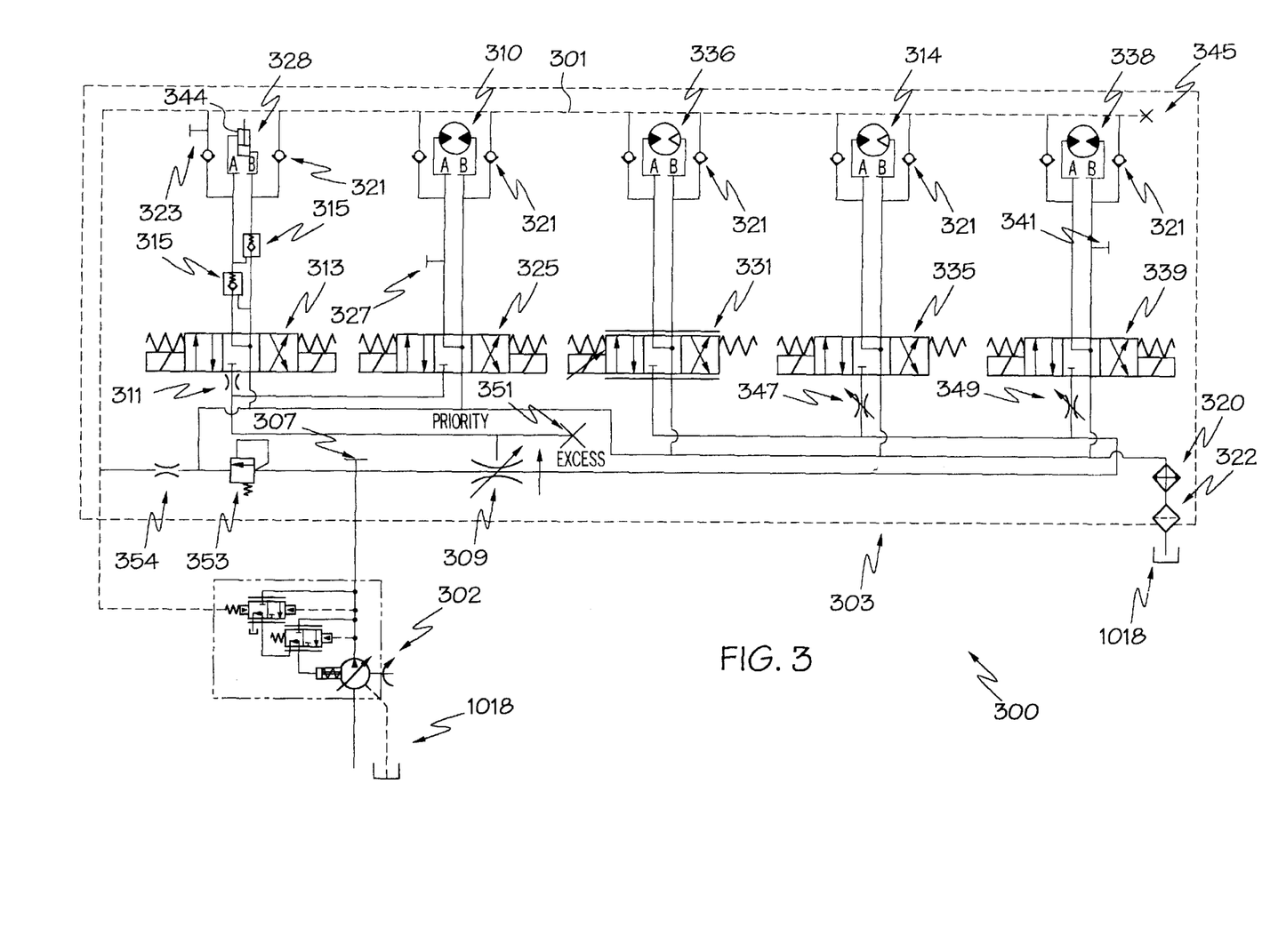
FIG. 3 illustrates a schematic diagram of a first embodiment of a hydraulic assembly in accordance with the present invention.
Figure 4:
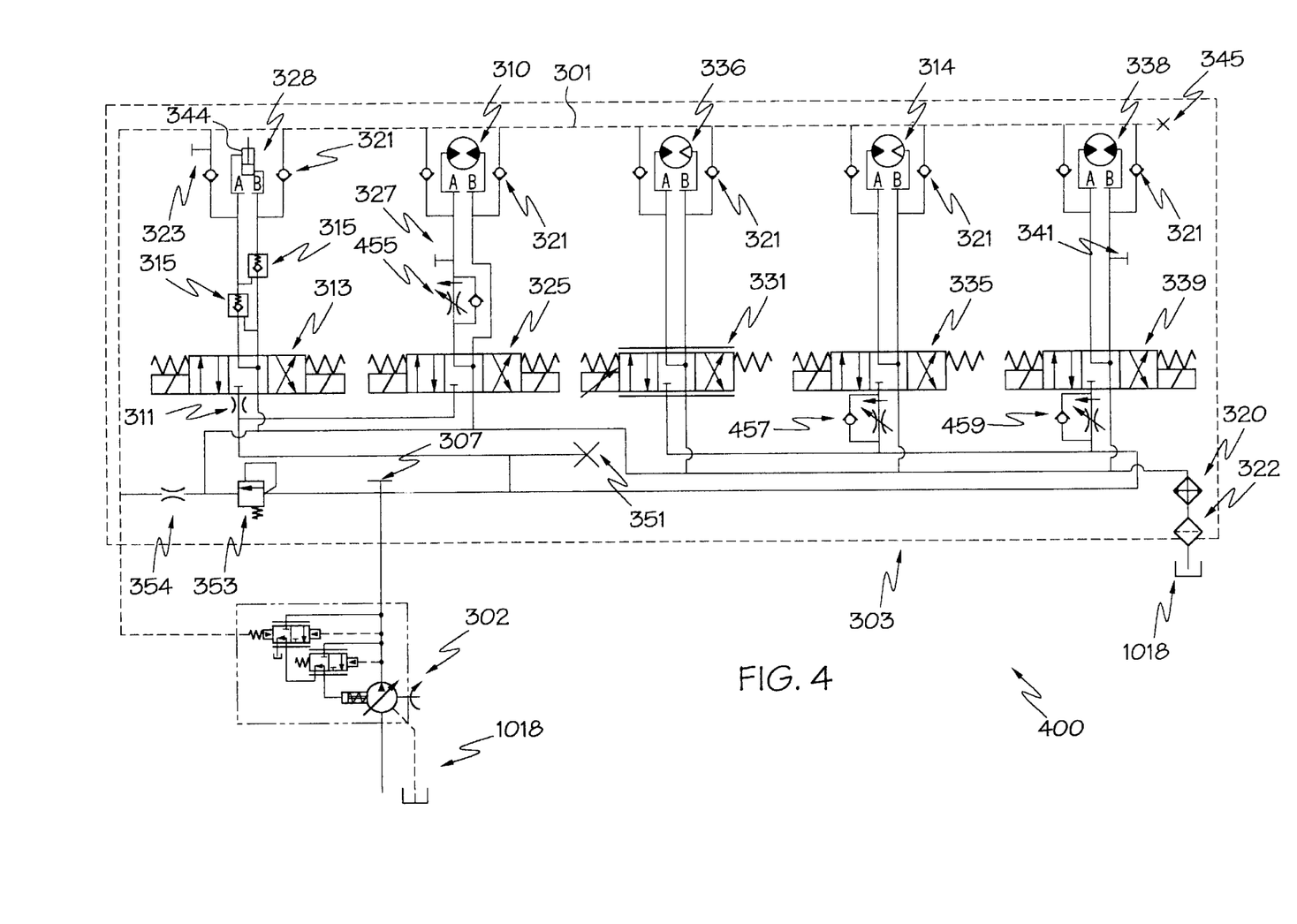
FIG. 4 illustrates a schematic diagram second embodiment of a hydraulic assembly in accordance with the present invention.

FIGS. 3 and 4 depict two hydraulic assemblies 300 and 400 in accordance with the present invention, wherein identical numbers illustrate similar components in each figure. The hydraulic assemblies 300 and 400 are designed to operate each of a plurality of functional devices, for example, the five functional devices, comprising the airlock discharge assembly 310, the feed roll 314, the discharge gate 328, the floor conveyor 336, and the agitator 338 of the bulk material discharge assembly 1000. While five functional devices are shown, it is understood that the hydraulic assemblies 300 and 400 may comprise more or less than five functional devices depending on the system requirements and/or options requested by the operator.

As shown in FIG. 3, for example, a hydraulic assembly 300 includes a variable displacement hydraulic pump 302 for pressurizing the system. The variable displacement hydraulic pump 302 includes a controller comprising a pressure flow compensator and a high-pressure compensator. The controller provides feedback, thereby allowing the pump to produce fluid flow based on the pressure drop throughout the circuit.

Using a variable displacement pump 302, rather than a fixed displacement pump, reduces the amount of heat created by the hydraulic system. The pressure flow compensator adjusts the flow output such that only enough flow is generated to maintain a predetermined pressure drop. If all the valves in the circuit are in a neutral position, the pump flow is approximately zero, resulting in little or no heat generation even though the input shaft is turning. The variable displacement pump 302 may also include a high-pressure compensator for directing the pump to provide little or no flow if all of the functions are stalled.

Each of the functional devices (e.g., the airlock discharge assembly 310, the feed roll 314, the discharge gate 328, the floor conveyor 336, and the agitator 338) of hydraulic assemblies 300 and 400 are provided with a check valve 321 to allow feedback to the pressure flow compensator of the pump 302. The check valves 321 interact so that only the functional device requiring the highest pressure communicates back to the pump 302 through the corresponding check valve. Fluid flow through one of the check valves 321 will charge the back line 301 with pressure, seating the remaining check valves, and thereby preventing depressurization of the back line 301.

An adjustable priority divider 309 divides the fluid into a priority flow and an excess flow. The priority divider 309 ensures that the pressure requirements from priority device(s) (i.e., device(s) powered with the priority flow) are met before powering any remaining non-priority device(s) (i.e., device(s) powered with the excess flow). Thus, once all of the demands of the priority device(s) are met, any remaining excess flow from the priority divider 309 powers the remaining non-priority device(s).

In the exemplary embodiment of FIG. 3, the airlock discharge assembly 310 and the discharge gate 328 are priority devices. The feeding devices (i.e., the feed roll 314, the floor conveyor 336, and the agitator 338) are non-priority devices powered by the excess flow from the adjustable priority divider 309. Changing the speed of the variable displacement pump 302 will proportionally change the speed of the feeding devices while the speed of the airlock discharge assembly 310 remains constant.

The priority divider 309 can be adjusted to change the amount of fluid flow in the priority path, and therefore allows speed adjustment of the priority devices. For example, as shown in FIG. 3, the operating speed of the airlock discharge assembly 310 may be changed by adjusting the priority divider 309 since the airlock discharge assembly 310 is a priority device powered by the priority flow from the priority divider 309.

In operation, the variable displacement hydraulic pump 302 is activated, thereby passing fluid through the adjustable priority divider 309. The priority divider 309 is then adjusted to optimize the angular velocity of the airlock discharge assembly 310 based on the type of bulk material to be dispensed. The priority flow from the divider 309 provides power to the priority devices (e.g., the airlock discharge assembly 310 and the discharge gate 328). Accordingly, any flow from the pump 302 will allow the discharge gate 328 to operate. As described above, the discharge gate 328 controls the size of the hopper opening, and thereby the rate at which bulk material is fed into the airlock discharge assembly 310 by the feed roll 314. A flow resistor 311 may be included to limit the speed in which the discharge gate 328 opens and closes. Limiting the gate speed helps an operator to open or close the gate at a controlled rate to easily obtain the desired hopper opening size. The flow resistor may be a fixed flow resistor 311, as shown in FIGS. 3 and 4, for a constant gate speed. Alternatively, the flow resistor may be variable (e.g., in the form of a needle valve) such that the operating speed of the discharge gate 328 may be adjusted.

In one particular example, the closure of the discharge gate 328 is operated by a hydraulic cylinder, for example cylinder 344. In this example, extending the cylinder 344 may force the discharge gate 328 to extend upwardly, thereby increasing the effective size of the hopper discharge opening 1038. Similarly, reversing the direction of the fluid flow may cause the hydraulic cylinder 344 to collapse, forcing the closure of the discharge gate 328 in a downward direction, and thereby decreasing the effective size of the hopper discharge opening 1038. It will be appreciated that the cylinder could be inverted such that extending the cylinder closes the discharge gate while collapsing the closure opens the discharge gate.

A directional valve 313 is provided to control the flow direction to the cylinder, and thereby the direction of movement of the discharge gate 328. As shown in FIG. 3, a directional flow valve such as an electrically actuated solenoid valve 313 is provided. The valve is spring centered to a neutral position wherein the discharge gate remains at a constant vertical orientation. If the operator desires to increase the bulk material flow rate, the discharge gate 328 may be opened by extending the hydraulic cylinder. The hydraulic cylinder may be expanded, for instance, by manually pressing a switch such that the valve moves from a neutral position to a first operating position wherein fluid flow causes the hydraulic cylinder to expand. Once the desired bulk material flow rate is achieved, the operator simply releases the switch, after which the directional valve 313 returns back to the neutral position by way of the centering springs and the position of the discharge gate is maintained. Similarly, to decrease the bulk material flow rate, the switch is activated such that the directional valve 313 encourages a fluid flow that causes the hydraulic cylinder to collapse, closing the gate and thereby reducing the bulk material flow rate. Once the desired flow rate is achieved, the switch is again released, after which the biasing springs relocate the directional valve 313 to the neutral position and the position of the discharge gate is maintained.

Pilot operated check valves 315 may also be provided in order to prevent the hydraulic cylinder of the discharge gate 328 from drifting once the desired position of the gate is reached.

The fluid released from the hydraulic cylinder will exit the system by following the exit path to the hydraulic tank 1018. Any back pressure in the back line 301 will be eased by excess fluid bleeding through the flow resistor 354 and back into the hydraulic tank 1018. The system may optionally be provided with a cooler 320 for lowering the temperature of the hydraulic fluid and may be further provided with a filter 322 for removing impurities in the system, prior to emptying back into the hydraulic tank 1018.

As noted above, the airlock discharge assembly 310 is another priority device linked in parallel with the discharge gate 328. A directional valve 325 is provided to establish the rotational direction of the airlock. A pressure switch 327 is further provided to cause an automatic reverse function. If a large object enters the airlock, it may cause the airlock to slow and/or stall and thereby create a pressure spike in the hydraulic system. The pressure switch 327 senses any corresponding pressure spike caused by the airlock discharge assembly 310 (e.g., at a predetermined resistant torque experienced by the airlock discharge assembly) to automatically reverse the operating direction of the airlock discharge assembly 310 and thereby dislodge the obstruction. Since the airlock discharge assembly 310 is isolated from the non-priority functional devices by the pressure compensated adjustable divider 309, pressure spikes from the non-priority feeding devices will not cause airlock discharge assembly 310 to autoreverse.

After the priority flow is met, any excess flow will travel through the adjustable priority divider 309 to power any non-priority devices. Examples of devices that may be placed in the circuit in a non-priority position include the feed floor 336, the feed roll 314 and/or the agitator 338.

The agitator 338, if provided, encourages bulk material to travel in the hopper 1012 from the rear 1028 of the hopper 1012 to the front 1030 of the hopper 1012. The agitator 338 may take the form of a feeding auger that encourages movement of the bulk material as the auger rotates about its rotational axis. The agitator 338 may be offset within the hopper 1012 in order to enhance the distribution of the bulk material and further discourage uneven "bridging" of material.

Excess fluid flow travels from the adjustable priority divider 309 to the agitator 338 by first traveling through a flow resistor. A fixed flow resistor, similar to item 311, that will establish a maximum agitator rotational speed independent of the speed of the pump 302 may be used. Alternatively, as shown in FIGS. 3 and 4, a needle valve 349, or other adjustable valve, may be used in order to manually change the maximum agitator rotational speed to vary the maximum flow rate of the bulk material within the hopper 1012.

The agitator 338 may also be provided with a pressure switch 341, similar to pressure switch 327, to cause an automatic reverse of the agitator if the agitator becomes jammed or otherwise blocked by bulk material.

The floor conveyor 336 may be provided to encourage movement of bulk material from a front portion 1030 of the hopper 1012 to a rear portion 1028 of the hopper 1012, thereafter being discharged through the hopper opening 1038 and into the airlock discharge assembly 310. The floor conveyor 336 may have two modes of operation (e.g., forward and reverse), but may also be provided with a single forward mode of operation as illustrated in FIGS. 3 and 4. A proportional valve may further be provided in the form of a variable solenoid valve 331 for varying the conveyor speed of the floor conveyor 336, and thus varying the flow rate of the bulk material out of the hopper 1012.

The feed roll 314 may further be provided to encourage and control the consistent flow of bulk material entering into the airlock discharge assembly 310 from the floor conveyor 336. The feed roll 314 may have two modes of operation (e.g., forward and reverse), but may also be provided with a single forward mode of operation as illustrated in FIGS. 3 and 4. An additional fixed flow resistor, similar to item 311, that will establish a maximum rotational speed independent of the speed of the pump 302 may be used. Alternatively, a needle valve 347, or other adjustable valve may be used in order to change the maximum rotational speed of the feed roll 314. A directional valve 335 is also provided to activate the feed roll 314.

The hydraulic assemblies 300 and 400 may include plugs (e.g., plug 345, and plug 351) and a tapping port 307 for taking measurements, draining and/or adding hydraulic fluid in the system. A sensor 323 may also be included to determine the pressure differential in the system.

As discussed above, the pump 302 includes a high-pressure compensator for directing the pump to provide little or no flow if all of the functions are stalled. An additional relief valve 353 may also be provided to protect the pump if the high-pressure compensator fails. The relief valve 353 will prevent the fluid from exceeding a maximum pressure by releasing hydraulic fluid through the exit path for eventual recovery by the hydraulic tank 1018.

FIG. 4 illustrates another exemplary embodiment of a hydraulic assembly 400 in accordance with the present invention that functions well in cool as well as warm environments and is capable of isolating other devices from pressure spikes. The hydraulic assemblies 300 and 400 have many of the same elements as indicated by identical reference characters. However, the hydraulic assembly 400 does not include the adjustable priority divider 309 of hydraulic assembly 300. Rather, the functions may be isolated with separate adjustable pressure compensated flow control valves. As illustrated in FIG. 4, for example, an adjustable pressure compensated flow control valve 455 isolates the airlock discharge assembly 310 from pressure spikes originating from devices other than the airlock discharge assembly 310. Similarly, another adjustable pressure compensated flow control valve 459 may be provided to isolate the agitator 338 from pressure spikes originating from devices other than the agitator 338.

Other devices may also include adjustable pressure compensated flow control valves in addition to a pressure switch, allowing the device to autoreverse in response to pressure surges resulting from that particular device. For instance, the feed roll 314 may be installed with a pressure switch (not shown) for an autoreverse function and may further include an adjustable pressure compensated flow control valve 457 to isolate the feed roll 314 from the other remaining devices.

All of the pressure compensated flow control valves (e.g., flow valves 455, 457 and 459) are adjustable such that the maximum speed of the corresponding device may be adjusted. Moreover, if a pressure switch is not used with the feed roll 314, the adjustable pressure compensated flow control valve 457 may be replaced by a variable flow resistor (e.g., a needle valve) to control the maximum speed of the feed roll 314. Alternatively, the adjustable pressure compensated flow control valve 457 may be replaced with a fixed flow resistor for setting the maximum feed roll speed.

Each of the hydraulic assemblies comprises a manifold 303 that includes the directional valves (e.g., directional valves 313, 325, 331, 335, and 339) for controlling the functional devices. In order to power the hydraulic assemblies 300 and 400, they may be provided with an electrical system. For instance, the engine 1014 may be equipped with a 12-volt electrical system for starting, running, and allowing the use of electrically powered accessories. Additionally, a relay network may be provided to operate each of the directional valves of the corresponding functional devices.

Provided herein is one embodiment of a suitable electrical power system for use in connection with the invention. Those skilled in the art will appreciate however that additional and different electrical power systems may be employed within the scope of the inventive hydraulic system. In one embodiment, to operate the electrical system, a key switch of the engine 1014 is first positioned in a "RUN" mode. In order to protect the engine from possible overheating conditions, and lack of oil pressure by a timing delay, a timer requires the engine to start within a predetermined time, for example, approximately 25 seconds, after the key is turned to the "RUN" mode.

Preferably, an emergency stop function (the E-stop function) is provided with a radio remote control hooked to a relay to shut down the engine in the event of an emergency. The E-stop also automatically moves an electrically actuated throttle control to the idle position, and shuts off the relays controlling the hydraulic valve.

Once the engine 1014 is running, the remote control is activated by powering a receiver on a control panel, and then turning on a hand held transmitter. The discharge gate 328 can be raised or lowered by actuating a manually controlled switch which energizes the discharge gate solenoid hydraulic valve 313.

A "START" button on the panel is depressed to activate the relays controlling the hydraulic valve and to energize the forward airlock solenoid, the feed roll solenoid, and the pressure switches controlling the airlock discharge assembly and agitator autoreverse functions. A "FLOOR ON/OFF" selector switch is turned to the "ON" position to energize the floor and forward agitator solenoids. These two solenoids are preferably on a time delay, and will not start, for example, for approximately 1.5 seconds after the switch is turned on. A switch on the panel or on the remote control is provided to change the speed of the engine 1014. The floor conveyor speed can be changed in the same way with similar controls. The material feeding devices can be stopped and started by remote control as they energize or de-energize the relay network controlling the hydraulic valves.

During operation, if the agitator pressure switch senses a high enough pressure to close the contacts, a timer relay is energized that de-energizes the agitator forward solenoid and energizes the reverse solenoid. The agitator solenoids will remain in this mode until the set time expires on the timer and it transfers back to its pervious condition. The electrical power system for the airlock auto-reverse works in much the same way. If the airlock pressure switch contacts close, they must do so for a certain period of time. If this time period is exceeded, a timer relay is activated to set off a series of events. First, the airlock forward solenoid is de-energized and the reverse solenoid is energized. The power is interrupted to the feed roll and the time delay controlling the floor conveyor and agitator, causing all three to stop. At the end of the airlock auto-reverse time interval, the airlock forward solenoid and the feed roll solenoid are re-energized. The time delay controlling the floor and agitator is also energized, and at the end of the delay, the agitator and floor solenoids are activated.

A "STOP" button may be depressed or the access doors to the airlock may be opened to de-energize all of the hydraulic solenoids, as well as disabling the "MATERIAL STOP/START" function of the remote. As a safety feature, it is preferred that the access doors must be closed and the panel "START" button must be pushed before the remote "MATERIAL STOP/START" function is restored.

While the invention is described in terms of isolation of a reversing device adapted to cause a first device to autoreverse, it is equally within the scope of the invention to isolate other functions in a hydraulic system. For example, the hydraulic system may comprise a variable displacement pump, a first device capable of being hydraulically powered by the pump, an actuator adapted to actuate a second device based on a pressure surge from the first device, and an isolation device adapted to prevent pressure surges resulting from a source other than the first device from actuating the actuator, thereby preventing undesirable actuation of the second device. In one exemplary embodiment, the first device is an airlock such that the actuator is adapted to sense pressure surges from the airlock to stop and/or slow down the function of one or more of the feed roll, floor conveyor, and/or the agitator.

The foregoing description of the various embodiments of the invention has been presented for the purposes of illustration and description. It is not intended to be exhaustive or to limit the invention to the precise form disclosed. Many alternatives, modifications and variations will be apparent to those skilled in the art. Accordingly, this invention is intended to embrace all alternatives, modifications and variations that have been discussed herein, and others that fall within the spirit and broad scope of the claims.

What is claimed is:

1. A hydraulic system comprising:
 a) a variable displacement pump including a pressure flow compensator to adjust flow output of a fluid such that only enough fluid flow is generated to maintain a predetermined pressure drop in the hydraulic system,
 b) a first device capable of being hydraulically powered by the pump,
 c) an actuator adapted to actuate a second device based on a pressure surge from the first device, and
 d) an isolation device adapted to prevent pressure surges resulting from a source other than the first device from actuating the actuator, thereby preventing undesirable actuation of the second device.

2. The hydraulic system of claim 1, wherein the actuator comprises a pressure switch.

3. The hydraulic system of claim 1, wherein the second device is included in the hydraulic system and comprises a directional valve.

4. The hydraulic system of claim 1, wherein the actuator is adapted to actuate the second device to cause the first device to autoreverse at a predetermined first device resistance torque.

5. The hydraulic system of claim 1, wherein the first device is capable of operating in a forward mode or a reverse mode and wherein the actuator is adapted to actuate the second device to cause the first device to autoreverse its operation from the forward mode to the reverse mode.

6. The hydraulic system of claim 1, wherein the first device comprises an airlock discharge assembly.

7. The hydraulic system of claim 1, wherein the isolating device comprises a flow divider.

8. The hydraulic system of claim 7, wherein the first device comprises an airlock discharge assembly.

9. The hydraulic system of claim 7, wherein the first device is powered by a priority flow from the flow divider.

10. The hydraulic system of claim 1, wherein the isolation device comprises a pressure compensated flow control valve.

11. The hydraulic system of claim 10, wherein the first device comprises an airlock discharge assembly.

12. The hydraulic system of claim 1, further comprising a third device capable of being hydraulically operated by the pump and wherein the isolation device is adapted to prevent pressure surges resulting from the third device from causing the actuator to actuate the second device.

13. The hydraulic system of claim 12, wherein the third device comprises a floor conveyor.

14. The hydraulic system of claim 12, wherein the third device comprises a feed roll.

15. The hydraulic system of claim 12, wherein the third device comprises an agitator.

16. The hydraulic system of claim 12, further comprising a reversing device adapted to cause the third device to autoreverse, and an additional isolation device adapted to prevent pressure surges resulting from a source other than the third device from actuating the reversing device, thereby preventing undesirable autoreversing of the third device.

17. The hydraulic system of claim 16, wherein the third device comprises an agitator.

18. A hydraulic system comprising:
 a) a variable displacement pump,
 b) a first device capable of being hydraulically powered by the pump,
 c) an actuator adapted to actuate a second device based on a pressure surge from the first device to cause the first device to autoreverse at a predetermined first device resistance torque, and
 d) an isolation device adapted to prevent pressure surges resulting from a source other than the first device from actuating the actuator, thereby preventing undesirable actuation of the second device.

19. A hydraulic system comprising:
 a) a variable displacement pump,
 b) a first device capable of being hydraulically powered by the pump, c) an actuator adapted to actuate a second device based on a pressure surge from the first device, wherein the first device is capable of operating in a forward mode or a reverse mode and wherein the actuator is adapted to actuate the second device to cause the first device to autoreverse its operation from the forward mode to the reverse mode, and d) an isolation device adapted to prevent pressure surges resulting from a source other than the first device from actuating the actuator, thereby preventing undesirable actuation of the second device.

20. A hydraulic system comprising:

a) a variable displacement pump, b) a first device comprising an airlock discharge assembly capable of being hydraulically powered by the pump, c) an actuator adapted to actuate a second device based on a pressure surge from the first device, and d) an isolation device adapted to prevent pressure surges resulting from a source other than the first device from actuating the actuator, thereby preventing undesirable actuation of the second device.

21. A hydraulic system comprising:

a) a variable displacement pump, b) a first device capable of being hydraulically powered by the pump, c) an actuator adapted to actuate a second device based on a pressure surge from the first device, and d) an isolation device comprising a flow divider adapted to prevent pressure surges resulting from a source other than the first device from actuating the actuator, thereby preventing undesirable actuation of the second device.

22. The hydraulic system of claim 21, wherein the first device comprises an airlock discharge assembly.

23. The hydraulic system of claim 21, wherein the first device is powered by a priority flow from the flow divider.

24. A hydraulic system comprising:

a) a variable displacement pump, b) a first device capable of being hydraulically powered by the pump, c) an actuator adapted to actuate a second device based on a pressure surge from the first device, and d) an isolation device comprising a pressure compensated flow control valve adapted to prevent pressure surges resulting from a source other than the first device from actuating the actuator, thereby preventing undesirable actuation of the second device.

25. The hydraulic system of claim 24, wherein the first device comprises an airlock discharge assembly.

26. A hydraulic system comprising:

a) a variable displacement pump, b) a first device capable of being hydraulically powered by the pump, c) an actuator adapted to actuate a second device based on a pressure surge from the first device, d) an isolation device adapted to prevent pressure surges resulting from a source other than the first device from actuating the actuator, thereby preventing undesirable actuation of the second device, and e) a third device capable of being hydraulically operated by the pump and wherein the isolation device is adapted to prevent pressure surges resulting from the third device from causing the actuator to actuate the second device.

27. The hydraulic system of claim 26, wherein the third device comprises a floor conveyor.

28. The hydraulic system of claim 26, wherein the third device comprises a feed roll.

29. The hydraulic system of claim 26, wherein the third device comprises an agitator.

30. The hydraulic system of claim 26, further comprising a reversing device adapted to cause the third device to autoreverse, and an additional isolation device adapted to prevent pressure surges resulting from a source other than the third device from actuating the reversing device, thereby preventing undesirable autoreversing of the third device.

31. The hydraulic system of claim 30, wherein the third device comprises an agitator.

32. A hydraulic system comprising:

a) a variable displacement pump, b) a first device capable of being hydraulically powered by the pump, c) an actuator adapted to actuate a second device based on a pressure surge from the first device to cause the first device to autoreverse, and d) an isolation device adapted to prevent pressure surges resulting from a source other than the first device from actuating the actuator, thereby preventing undesirable actuation of the second device.

33. The hydraulic system of claim 32, wherein the variable displacement pump includes a pressure flow compensator to adjust flow output of a fluid such that only enough fluid flow is generated to maintain a predetermined pressure drop in the hydraulic system.

34. The hydraulic system of claim 32, wherein the actuator comprises a pressure switch.

35. The hydraulic system of claim 32, wherein the second device is included in the hydraulic system and comprises a directional valve.

* * * * *